(12) United States Patent
Hwang et al.

(10) Patent No.: US 11,567,858 B2
(45) Date of Patent: Jan. 31, 2023

(54) SYSTEM AND METHOD FOR USER INTERFACE AUTONOMOUS TESTING

(71) Applicant: APPTEST.AI, Seoul (KR)

(72) Inventors: Jae Jun Hwang, Seoul (KR); Hyun Jin Park, Yongin-si (KR); Ju Hyeon Lee, Seoul (KR)

(73) Assignee: APPTEST.AI, Seoul (KR)

( * ) Notice: Subject to any disclaimer, the term of this patent is extended or adjusted under 35 U.S.C. 154(b) by 11 days.

(21) Appl. No.: 17/137,777

(22) Filed: Dec. 30, 2020

(65) Prior Publication Data

US 2022/0206931 A1 Jun. 30, 2022

(30) Foreign Application Priority Data

Dec. 28, 2020 (KR) ........................ 10-2020-0184995

(51) Int. Cl.
*G06F 9/44* (2018.01)
*G06F 11/36* (2006.01)
*G06F 40/279* (2020.01)

(52) U.S. Cl.
CPC ...... *G06F 11/3688* (2013.01); *G06F 11/3692* (2013.01); *G06F 40/279* (2020.01)

(58) Field of Classification Search
CPC . G06F 11/3688; G06F 11/3692; G06F 40/279
See application file for complete search history.

(56) References Cited

U.S. PATENT DOCUMENTS

| 2015/0100486 A1* | 4/2015 | Green ................. G06Q 20/227 705/41 |
| 2015/0339213 A1* | 11/2015 | Lee ....................... G06F 3/0484 717/125 |
| 2020/0073921 A1* | 3/2020 | Bradley ............... G06F 40/226 |
| 2021/0333983 A1* | 10/2021 | Singh .................. G06V 10/225 |

FOREIGN PATENT DOCUMENTS

| KR | 10-2012-0040419 A | 4/2012 |
| KR | 20150069455 A | 6/2015 |
| KR | 10-2016-0070410 A | 6/2016 |
| KR | 10-2018-0058579 A | 6/2018 |
| KR | 10-2075111 B1 | 2/2020 |
| WO | 2013/145629 A1 | 12/2015 |

* cited by examiner

*Primary Examiner* — Chat C Do
*Assistant Examiner* — Lenin Paulino
(74) *Attorney, Agent, or Firm* — Brooks Kushman P.C.

(57) ABSTRACT

Provided is a system and method capable of automatically testing a website or application for an error in a user interface without human intervention. As an example, in a system for testing an error in a user interface of an application or website, a user interface system that includes a testable action recognizer that obtains a screenshot of a screen of the application or website, manages a layout and a test action based on user interface (UI) configuration and text recognition information from the screenshot, and a test action generator that receives the layout, selects a test scenario corresponding the layout, and performs a test action according to the test scenario, and in which the testable action recognizer manages whether or not a test is progressed for each screen layout according to the test scenario, is disclosed.

16 Claims, 21 Drawing Sheets

FIG.5
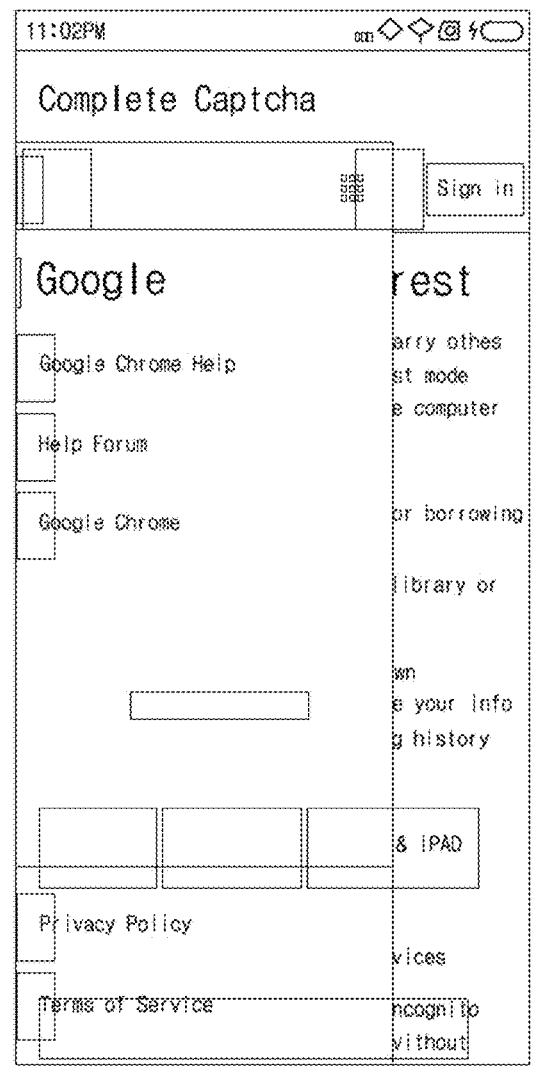

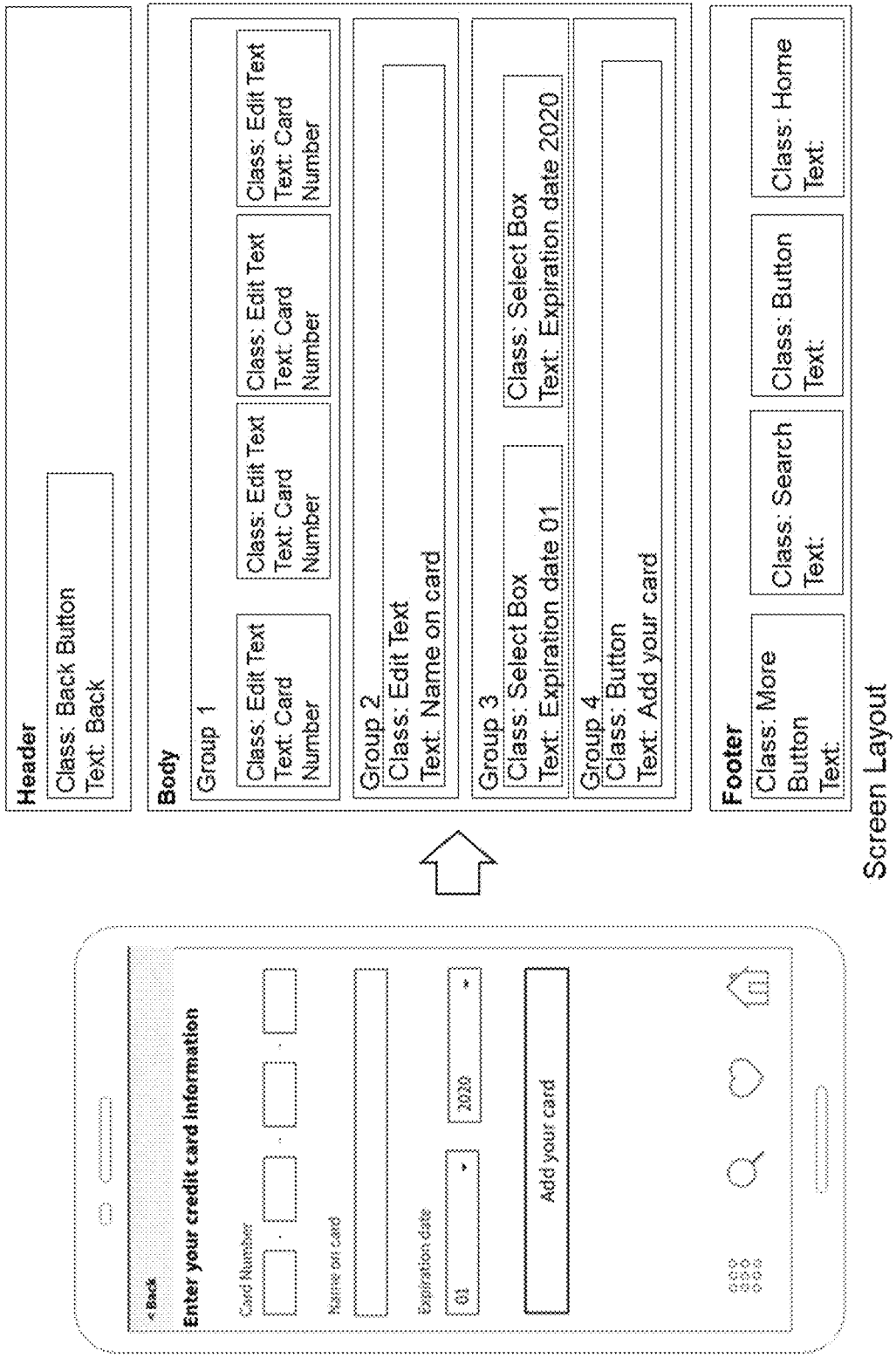

FIG.8

Screen path: Home > Today's Deal

| Group | Group Type | Order | Class | Text | Action | Tested |
|---|---|---|---|---|---|---|
| 1 | Head | 1 | Button | Home | Touch | Yes |
| 1 | Head | 2 | Button | Today's Deal | Touch | No |
| 1 | Head | 3 | Button | Gift Cards | Touch | No |
| 1 | Head | 4 | - | - | Horizontal scroll | No |
| 2 | Body | 1 | Content | Apparel | Touch | Yes |
| 2 | Body | 2 | Content | Security Camera | Touch | No |
| 2 | Body | 3 | Content | Kitchen Appliance | Touch | No |
| 2 | Body | 4 | Content | Accessories | Touch | No |
| 2 | Body | 5 | - | - | Vertical Scroll | No |
| 3 | Footer | 1 | More Button | - | Touch | No |
| 3 | Footer | 2 | Search Button | - | Touch | No |
| 3 | Footer | 3 | Button | - | Touch | No |
| 3 | Footer | 4 | Home Button | - | Touch | No |

Sample test action table at this stage

FIG.9

Screen path: Home > Enter your credit card information

| Group No | Group Type | Order | Class | Text | Action | Tested |
|---|---|---|---|---|---|---|
| 1 | Head | 1 | Button | Back | Touch | No |
| 2 | Body | 1 | EditText | Card Number | Input Text | No |
| 2 | Body | 2 | EditText | Card Number | Input Text | No |
| 2 | Body | 3 | EditText | Card Number | Input Text | No |
| 3 | Body | 1 | EditText | Name on card | Input Text | No |
| 3 | Body | 1 | Select List | Expiration date 01 | Select | No |
| 3 | Body | 2 | Select List | Expiration date 2020 | Select | No |
| 4 | Body | 1 | Button | Add your card | Button | No |

FIG.11 a

| | |
|---|---|
| Name | John doe |
| Age | 28 |
| Job | Software developer |
| Email | john.testbot@gmail.com |
| Address | 201, Songpa-daero, Songpa-gu, Seoul, Republic of Korea |
| Mobile Phone | Device: iPhone 8, OS: iOS 14.01, Language: English |
| Credit Card | Master Card: 4716074056265624, 412 |
| Chatting app | WhatsApp account: gildong@gmail.com<br>Facebook Messenger: N/A |
| SNS | Facebook account: gildong@gmail.com<br>Pinterest account: pintest-testbot32@gmail.com<br>Tweeter account: tweeter-testbot32@gmail.com<br>Instagram account: N/A |

FIG.12

Screen path: Home > Enter your credit card information

| Group No | Group Type | Order | Class | Text | Action | Intent | Entity | Tested |
|---|---|---|---|---|---|---|---|---|
| 1 | Head | 1 | Button | Back | Touch | Back | | No |
| 2 | Body | 1 | EditText | Card Number | Input Text | Input_credit_card_number | Number1 | No |
| 2 | Body | 2 | EditText | Card Number | Input Text | Input_credit_card_number | Number2 | No |
| 2 | Body | 3 | EditText | Name on card | Input Text | Input_credit_card_number | Number4 | No |
| 3 | Body | 1 | Select List | Expiration date 01 | Select | Input_credit_card_expiration_date | Month | No |
| 3 | Body | 2 | Select List | Expiration date 2020 | Select | Input_credit_card_expiration_date | Year | No |
| 4 | Body | 1 | Button | Add your card | Button | Confirm | | No |

FIG.13 b

| Group No | Group Type | Order | Class | Text | Action | Intent | Entity | Tested |
|---|---|---|---|---|---|---|---|---|
| 1 | Head | 1 | Button | Back | Touch | Back | | No |
| 2 | Body | 1 | EditText | Card Number | Input Text | Input_credit_card_number | 4716 | No |
| 2 | Body | 2 | EditText | Card Number | Input Text | Input_credit_card_number | 0740 | No |
| 2 | Body | 3 | EditText | Card Number | Input Text | Input_credit_card_number | 5626 | No |
| 3 | Body | 1 | EditText | Name on card | Input Text | Input_credit_card_expiration_date | 5624 | No |
| 3 | Body | 1 | Select List | Expiration date 01 | Select | Input_credit_card_expiration_date | 04 | No |
| 3 | Body | 2 | Select List | Expiration date 2020 | Select | Input_credit_card_expiration_date | 2020 | No |
| 4 | Body | 1 | Button | Add your card | Button | Confirm | | No |

SYSTEM AND METHOD FOR USER INTERFACE AUTONOMOUS TESTING

CROSS-REFERENCE TO RELATED APPLICATIONS

This application claims priority to Korean Patent Application No. 10-2020-0184995 filed on Dec. 28, 2020, the disclosure of which is hereby incorporated in its entirety by reference herein.

TECHNICAL FIELD

Embodiments relate to a system and method capable of automatically testing a website or an application to find an error in a user interface without human intervention.

BACKGROUND

Before launching a new service or updating a new function, information technology (IT) companies that provide a service platform test functions in the platform to ensure all the functions work correctly.

Previously, a test was done by people with a development version of a platform according to various scenarios.

As competition among IT companies intensifies, the type of functions within a platform has varied, but the time spent for a launch or an update needed to be shortened. Thus, when testing a platform, there has been a problem of significantly increasing manpower, time and cost.

Accordingly, IT companies have outsourced humans to test the platforms individually or developed a separate test program to conduct automated testing.

However, human testing has a problem in that a deviation can occur in accuracy and time according to the skill level of the tester. In addition, as the function and application environment of a platform become complex, the cost increases exponentially.

In a method of developing a test program, the test program needs to be modified every time a change occurs in a platform, so the development period can increase. There are also many cases where a non-error is reported as an error due to a wrong implementation of the test program. Accordingly, such method is not practical and can be problematic.

SUMMARY

An aspect of the present invention provides a system and a method capable of automatically testing an application or a website to find an error in a user interface without human intervention.

According to at least one embodiment, a system for user interface autonomous testing, which finds an error in a user interface of an application or a website, includes four components, a testable action recognizer, a test action generator, an error recognizer, and an external service integrator. A testable action recognizer obtains a screenshot of an application or a website, recognizes a layout from the screenshot based on user interface (UI) configuration and text recognition information, and converts the layout into a test action. A test action generator receives the test action, selects a test scenario corresponding to the test action, and performs the test action according to the test scenario. An error recognizer recognizes an error by checking a test result. An external service integrator verifies whether the test action for an external system is accurately reflected in the external system. In the system for user interface autonomous testing, the testable action recognizer may include a test action manager. In the layout, UI element objects such as buttons and test input boxes (EditText) may be grouped into a common part (Header, Footer), which is a repetitive part in an application or a website, and a variable part (Body). The test action manager may store a table listing test actions with test status information, whether the test is in progress or not. In the system for user interface autonomous testing, the test action manager may store a layout of a corresponding screen and an available test action in the table.

In the system for user interface autonomous testing, the testable action recognizer may recognize the layout by combining UI element objects, text recognition information and hierarchical structure information (UI Hierarchy) of UI elements on a screen sent from an operating system.

In the system for user interface autonomous testing, the testable action recognizer may further include a UI element detector that in advance learns and stores model parameters which enable the UI element detector to recognize the UI element objects and detects the UI element objects based on the learned parameters through machine learning.

In the system for the UI autonomous testing, the test action generator may further include an intent/entity detector that chooses intents and entities on the screen based on the UI element objects or text information and store the chosen intents and entities.

In the system for the UI autonomous testing, the test action generator may further include a test persona repository which stores information of a virtual person set in advance. In the system for the UI autonomous testing, the test action generator may further include an intent/entity matcher that fetches data of a matching type from the test persona repository according to a context acquired from the UI element objects or text recognition information.

In the system for the UI autonomous testing, the test persona repository may store at least one virtual person with an email, a mobile phone number, and credit card information available for a real test.

In the system for the UI autonomous testing, the test issue recognizer may detect whether or not an error has occurred in a system log or a message on the screen.

In the system for the UI autonomous testing, the external service integrator may detect an error by verifying correct performance of functions, such as sending a mail and entering a social media comment, which perform an action in a system but a result is reflected in the external system.

According to another embodiment, a method for user interface autonomous testing in a user interface (UI) of an application or a website, includes following steps. First, a test action generator fetches a test scenario previously set on an intent basis according to a classification of the application or the website. Second, a testable action recognizer recognizes a layout from a screenshot of the application or the website. Third, the test action generator detects a list of testable actions based on layout information and selects the test action based on the test scenario and the list of testable actions. Fourth, the test action generator generates test data. Finally, the test action generator performs the test action on the screen of the application or the website.

In the method for the UI autonomous testing, the testable action recognizer may include a test action manager, and the layout is grouped into a common part (Header, Footer) which is a repetitive part in an application or a website, and a variable part (Body) The test action manager may store a table listing test actions with test status information, whether or not the test is in progress.

In the method for the UI autonomous testing, the test action manager may store a layout of a corresponding screen and an available test action in the table.

In the method for the UI autonomous testing, the testable action recognizer may recognize the layout by combining UI element objects (Elements or Widgets), text recognition information of the screen and hierarchical structure information (UI Hierarchy) of UI elements on a screen sent from an operating system.

In the method for the UI autonomous testing, the testable action recognizer may further include a UI element detector that in advance learns and stores model parameters which enable the UI element detector to recognize the UI element objects and detects the UI element object based on the learned parameter through machine learning.

In the method for the UI autonomous testing, the test action generator may further include an intent/entity detector that chooses intents and entities on the screen based on the UI element objects or text information.

In the method for the UI autonomous testing, the test action generator may further include a test persona repository which stores information of a virtual person set in advance.

In the method for UI autonomous testing, the test action generator may further include an intent/entity matcher that fetches data of a matching type from the test persona repository according to a context acquired from the UI element objects or text recognition information.

In the method for the UI autonomous testing, the test persona repository may store at least one virtual person with an email, a mobile phone number, and credit card information available for a real.

The method for the UI autonomous testing may further include an external service integrator that accesses an external system to check whether the test action has actually occurred when the user test action affects the external system such as sending an email. The system for UI autonomous testing and a method according to the present invention can recognize the UI element objects and text that need to be tested on a screenshot image, recognize a layout of the screen by combining UI layer information provided by the operating system and make a list of available test actions. In addition, a test is performed by recognizing the intent on the screen in real time and choosing a matching test from the test scenarios based on an intent set in advance according to the classification of applications, such as shopping, news, messenger, or website. When specific data such as text or numbers are required to be entered, the main functions of the application or the website can be automatically tested without human intervention by allowing the specific data to be entered automatically using preset test persona information. In addition, even if an appropriate scenario is not set, the intent to be tested and the object information to be entered can be recognized on the screen and information of the matching test persona can be entered. Thus, this search test is more effective than a normal random test. Since the screen is managed as a test action list (table) abstracted into intents and entities, slightly different screens with small design changes or content changes are recognized as the same screen, so duplicate tests are prevented, and thus, more functions can be tested in the same time period than a random test.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings:

FIG. 5 illustrates an example in which a UI layout is recognized by a UI layer information adapter of the system for user interface autonomous testing according to the embodiment of the present invention on an exemplary home screen;

FIG. 8 illustrates a diagram illustrating a test action table of the test action manager of the system for user interface autonomous testing according to the embodiment of the present invention on an exemplary home screen;

FIG. 9 illustrates the test action table of the test action manager of the system for user interface autonomous testing according to the embodiment of the present invention on an exemplary credit card information input screen;

FIG. 12 illustrates information stored by an intent/entity recognizer used in the system for user interface autonomous testing according to the embodiment of the present invention;

DETAILED DESCRIPTION

Figure 1:
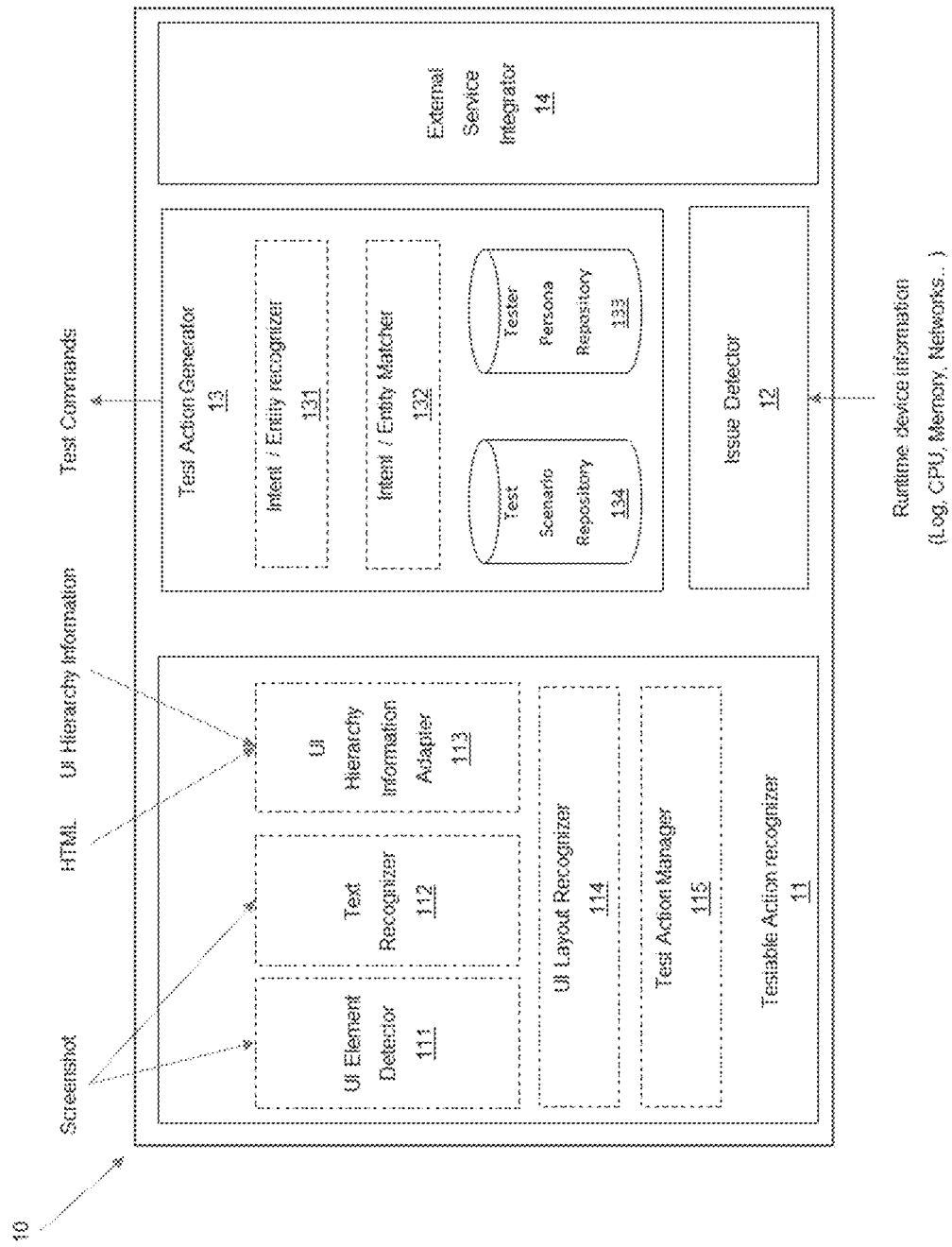
FIG. 1 illustrates a configuration diagram of a system for user interface autonomous testing according to an embodiment of the present invention.

Hereinafter, preferred embodiments will be described in detail with reference to the accompanying drawings.

The present invention may, however, be embodied in many different forms and should not be construed as being limited to the embodiments set forth herein: rather, these embodiments are provided so that those skilled in the art thoroughly understand the present invention. Rather, these embodiments are provided so that this disclosure will be thorough and complete, and will fully convey the scope of the present invention to those skilled in the art.

Also, in the drawing figures, the dimensions of layers and regions may be exaggerated for clarity of illustration. Like reference numerals refer to like elements throughout. As used herein, the term "and/or" includes any and all combinations of one or more of the associated listed items. In this specification, it will also be understood that when a member A is referred to as being connected to a member B, the member A can be directly connected to the member B or indirectly connected to the member B with a member B therebetween. The terms used herein are for illustrative purposes of the present invention only and should not be construed to limit the meaning or the scope of the present invention.

As used in this specification, a singular form may, unless definitely indicating a particular case in terms of the context, include a plural form. Also, the expressions "comprise" and/or "comprising" used in this specification neither define the mentioned shapes, numbers, steps, operations, members, elements, and/or groups of these, nor exclude the presence or addition of one or more other different shapes, numbers, steps, operations, members, elements, and/or groups of these, or addition of these. The term "and/or" used herein includes any and all combinations of one or more of the associated listed items.

As used herein, terms such as "first," "second," etc. are used to describe various members, components, regions, layers, and/or portions. However, it is obvious that the members, components, regions, layers, and/or portions should not be defined by these terms. The terms do not mean a particular order, up and down, or superiority, and are used only for distinguishing one member, component, region, layer, or portion from another member, component, region, layer, or portion. Thus, a first member, component, region, layer, or portion which will be described may also refer to a second member, component, region, layer, or portion, without departing from the teaching of the present invention.

Spatially relative terms, such as "below", "beneath", "lower", "above", "upper" and the like, used herein for ease of description to describe one element or feature's relationship to another element(s) or feature(s) as illustrated in the figures. These spatially relative terms are intended for easy comprehension of the prevent invention according to various process states or usage states of the prevent invention, and thus, the present invention is not limited thereto. For example, an element illustrated in the drawings is turned inside out, the element described as "beneath" or "below" may change into "above" or "upper". Thus, the term "below" may encompass the term "above" or "below".

Preferred embodiments of the present invention will be described in detail with reference to the drawings to the extent that a person of ordinary skill in the art can easily implement the present invention.

Hereinafter, a system for user interface autonomous testing 10 according to an embodiment of the present invention will be described.

FIG. 1 illustrates a configuration diagram of a system for user interface autonomous testing according to an embodiment of the present invention.

First, referring to FIG. 1, the system for user interface autonomous testing 10 according to an embodiment of the present invention can include a testable action recognizer 11, an issue detector 12, a test action generator 13, and an external service integrator 14.

The testable action recognizer UI can determine testable actions for an application or a website to be tested. To this end, the testable action recognizer 11 determines an available test action on the current screen by combining a user interface (UI) element objects, text, and UI layer information for the current screen. Specifically, the testable action recognizer 11 can include a UI element detector 111, a text recognizer 112, a UI hierarchy information adapter 113, a UI layout recognizer 114, and a test action manager 115.

The UI element detector 111 can perform object detection from a screen shot of a currently displayed screen to recognize UI elements to be tested. In particular, the UI element detector 111 can perform machine learning, particularly deep learning, and an accuracy thereof can increase according to the learning. To this end, the UI element detector 111 can calculate and store model parameters for object detection by learning previously collected screenshot images of an application or a website collected, and recognize types (classes) and positions (bounding boxes) of the UI element objects on a screen under test, based on the learned model parameters.

The text recognizer 112 can recognize and extract text from a screen shot of the current screen. In particular, the text recognizer 112 can use an optical character recognition (OCR) technique for text extraction. Through the OCR, the text recognizer 112 can extract all texts on the current screen, and as will be described later, the testable action recognizer 11 can use information of this text to infer values and types of data to be input to a corresponding area.

The UI hierarchy information adapter 113 can extract layout information of a corresponding screen from UI layer information provided by an operating system. This UI layer information is provided by the operating system by collecting identification (ID) values or text values, which are given to UI elements by an application or a website developer in order to control each UI element while programming the UI, and descriptive data entered for the visually impaired, which comes in a different format depending on the operating system (e.g., Android®, iOS®) and development platform (Web, App). In the present invention, a UI hierarchy information adapter 113 converts UI layer information, which comes in a different format for each development platform, into an internally standardized format. Through this standardization, the system for UI autonomous testing according to the present invention can be applied to a third operating system or a development platform, only by adding an adapter without any changes of the remaining components. However, this information was entered by the developer of the application or the website and the collection of the information is performed by the operating system performs in the background, and thus information omissions or inconsistencies often occur. For example, if the developer has not set descriptive data or text for an image, blank data will come in, and if the time when the screen shot was taken and the time when the operating system provided UI layer information is different, integrity between the two information will not match. FIG. 5 illustrates a situation where the layout information received from the UI layer information and the actual screenshot layout are very different. Accordingly, in the present invention, it is possible to recognize the UI layout by directly recognizing the screenshot image and obtaining information on the UI element objects and text information without only relying on the UI layer information provided by the operating system.

The UI layout recognizer 114 can determine a layout of the current screen by combining the UI element objects detected by the UI element detector 111, the text extracted from the text recognizer 112, and the hierarchy information drawn by the UI hierarchy information adapter 113. In addition, the UI layout recognizer 114 suppresses duplicate tests of a common part by classifying the layout of the corresponding screen into a common part (header, Footer) area, shared by screens of the same application or website, and a variable part (Body). Furthermore, if there is a unit of multiple values for the variable part, for example a birthday, the test action of a birthday input is guaranteed to be performed collectively with the three UI element objects of a month, a day, and a year, by combining the three date values into one group.

Based on the type (Class), text (Value), and location (Bounding Box) information of each UI element included in the layout input from the UI layout recognition unit 114, the test operation manager 115 can organize test actions into a list in the form of a table, and record and manage what kind of test data is generated and performed by a test action generator 13 to be described later. The test action manager abstracts and manages the screen based on the test action, thereby preventing duplicate tests of the same test action on the screen. For example, in the case of an initial screen of a shopping mall, as products are changed, text values of UI elements are changed each time the initial screen is accessed. Thus, the same screen of a shopping mall can be recognized as a different screen, and a test of selecting (e.g., Click) a product at the same location can be repeated infinitely. After configuring the test action table for each screen, the text action manager compares the previously recorded test action table with the current test action table in consideration of the type of each UI element to prevent duplicate test action tables for the same screen from being created and managed. For example, when UI elements of the same type are arranged in the form of a list or a grid, it is determined whether the screens are the same by comparing only the arrangement form except for the text information of each UI element. Due to the test action manager 114, the system for user interface autonomous testing 10 according to an embodiment of the present invention can perform a test without omission or repeating the test action.

The issue detector 12 can detect an error or a performance problem by monitoring a log history of a device being tested, CPU, memory, network status, etc. For example, when an error indication appears on a screen or a log of an application kill is detected, the issue detector 12 reports information of the screen where an error occurred, input data used at that time, an error log and a message.

The test action generator 13 receives the test action list of the corresponding screen from the testable action recognizer 11 described above and generates input data necessary for testing the corresponding screen in an appropriate format. To this end, the test action generator 13 can include an intent/entity recognizer 131, an intent/entity matcher 132, a test persona repository 133, and a test scenario repository 134.

First, the intent/entity recognizer 131 can change recognized texts on a screen into intents and entities. Intent and Entity are technical terms generally used when modeling a conversation system such as chatbot. In general, an intent is a unit of conversation in which words come and go or the intention of a speaker conveyed through the conversation, and an entity is a specific requirement in the intentions. For example, in a sentence "Please select a credit card type", an intent is "Please select" and an entity is "Credit card type". The intent/entity recognizer 131 can be based on natural language processing (NLP) technology. For example, when there is an option selection UI element (Radio) of 'card A', 'card B', and 'card C' on a screen and the text in the nearest position is 'select payment method', the intent/entity recognizer 131 can recognize 'select credit card' as an intent and 'card A', 'card B', and 'card C' as entities.

The intent/entity matcher 132 can convert test actions of the corresponding screen into intents and entities and store them in the test action table. By using the intent/entity matcher 132, a screen can be defined based on an abstracted intent instead of a specific terminology used by each application or website. Through this, it is possible to perform testing while recognizing intents and determining whether the defined test scenario and the current test screen match on the intent basis in real time. Thus, it is possible to test applications or websites of the same classification with generalized test scenarios designed based on intents without creating test scenarios for each application or website.

On the other hand, the test action generator 13 can select the intent with the highest priority based on the test action table managed on the intent basis by the intent/entity matcher 132 and choose an action for executing the selected intent. For example, in a scenario for purchasing goods through account transfer, if there are two intents on a single test screen 'select a credit card' and 'input bank account number', the test action generator 13 selects the highly prioritized 'input deposit bank account' intent and generates data related to this intent.

The tester persona repository 133 can set and store information of a virtual person having the same conditions as those of ordinary people when the system for the UI autonomous testing 10 according to an embodiment of the present invention operates. For example, the test persona repository 133 can virtually generate a 28-year-old person named 'John Doe', and set information such as a job, an email, an address, a mobile phone number, a credit card information, a chat app, and a social media in advance. In particular, information of an email and a mobile phone number can be used to authenticate a person in a specific application or a website, and a credit card information is frequently required in a test for purchasing a paid item or a test for online shopping. Therefore, in order to prevent errors due to input data during the test, it is preferable for the test persona repository 133 to set an email, a mobile phone number, and/or a credit card information to be actually usable when generating/storing information of a virtual person in advance. Most of the modern applications or websites do not operate alone but are used in conjunction with various external systems. Therefore, in order to test this connection, an external system account should be available and the result of test action thereof should be checked by accessing the system. The test persona of the present invention differs from the existing methods in that it has both data for testing the corresponding system, as well as information and settings for testing such external system connection.

The test scenario repository 134 can store a scenario with which a test proceeds, that is, a test path, through the system for user interface autonomous testing 10 according to an embodiment of the present invention. The test scenario can beset according to the classification of the application or website. For example, all online shopping applications create a test scenario with a series of actions (intents) to search, select, enter the personal information and address to be delivered from the main home screen, and make payments via credit card. The classification of the application or website to be tested can be obtained by scraping the site information if the application has already been posted on the app store, or the developer can directly designate it before the start of the test, and it can also be inferred through intent information recognized on the initial screen.

The external service integrator 14 makes it possible to verify whether the operation was normally performed in the external system when the test action of the system for user interface autonomous testing 10 according to the embodiment of the present invention occurs in the external system. For example, when there is a button called 'Post' on social media (e.g. Facebook®) on the screen, after performing this test action, a user can check if there is a new posting on the initial screen of the social media owned by the test persona, and the user can report an error when it is not posted. As described above, the system for the UT autonomous testing 10 according to an embodiment of the present invention can grasp the layout and test action by combining UI configuration, text recognition, and UI layer information based on a screenshot for an application or a website for testing. And, according to the classification of the application or website, the test is conducted according to the pre-defined test scenario on the intent basis, and, when data such as text rather than simple clicks or touches needs to be input, the data can be input using information of the test persona. In addition, each test path and whether or not to proceed with the test can be organized into an abstracted test action table from which the design or content information of the screen has been removed, so that the test can be performed accurately and quickly while minimizing duplicate tests.

Figure 2:
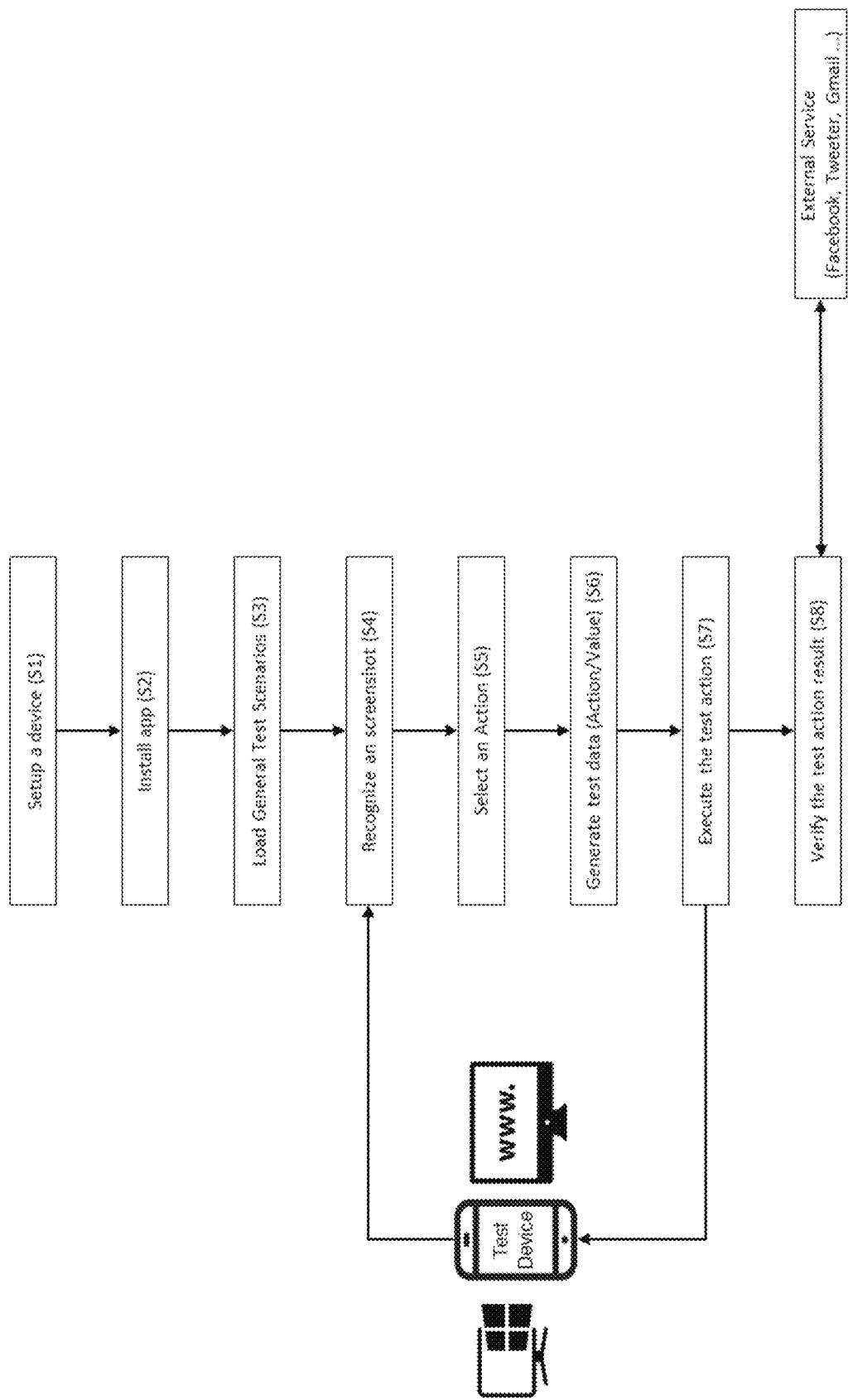
FIG. 2 illustrates a flowchart illustrating a test action of the system for user interface autonomous testing according to the embodiment of the present invention.

Hereinafter, a test method using the system for UI autonomous testing 10 according to an embodiment of the present invention will be described step by step. FIG. 2 illustrates a flowchart illustrating a test action according to the system for user interface autonomous testing according to an embodiment of the present invention. Referring to FIG. 2, the test method using the system for the UI autonomous testing 10 according to the embodiment of the present invention includes steps of device setup (S1), application installation (S2), loading a generalized test scenario (S3) application screenshot recognition (S4), operation selection (S5), test data generation (S6), test action execution (S7), and test action result verification (S8) can be included. Hereinafter, each step of FIG. 2 will be described with reference to FIGS. 3 to 15.

First, in the device setup (S1) step, for the operation of the system for user interface autonomous testing 10 according to an embodiment of the present invention, a test environment of the test device can be configured. Specifically, an action such as selecting an operating system version of the system 10 test device, installing an application that can conflict with a corresponding application or that must be installed first can be performed in advance. For example, if a banking app is intended to be tested, a vaccine app, which is an essential app, is installed first, and the Facebook app is installed with an account held by Test Persona and is logged in to prepare for normal Facebook-linked testing in the bank app.

In the application installation (S2) step, the application to be tested can be installed on the test device. In this step, an installation file before application distribution can be installed on the test device by receiving the installation file from the developer of the company requesting the test. It is also possible for general users to download and install an installation file by accessing an app store where applications are downloaded from a smartphone or a tablet. In the case of a website, an installation file is used on a website along with ActiveX and installs data files necessary to run websites such as programs and public certificates.

In the loading a generalized test scenario (S3) step, among the test scenarios stored in the test scenario repository 134, one suitable for the application or website can be selected and loaded. As described above, when the classification of the application is already posted on the app store, a test scenario suitable for the classification can be easily selected. If necessary, it is possible to set an appropriate test scenario by receiving the details of the application from the developer, and it is also possible to fetch the scenario after inferring the classification from the intent of the initial screen after running the application.

In the application screenshot recognition step (S4), starting from the home screen initially displayed when each application or website is executed, a screen shot of the screen can be acquired and recognized step by step according to the test scenario. In this step, the screenshot can be transferred to the testable action recognizer 11 together with UI layer information of the corresponding screen.

The operation selection (S5) step will be described with reference to FIG. 3. In the case of the shopping application illustrated in FIG. 3, a screen consists of a simple content selection (Click) test action. As described above, the UI element detector 111 can detect a UI configuration based on existing deep learning model from the screenshot of the home screen, and the text recognizer 112 can also recognize the text of each area from the screenshot. Finally, the UI hierarchy information adapter 113 generates a screen layout using UI layer information provided by the operating system. These three pieces of screen information are integrated by the UI, layout recognizer 114 and then divided into a common part (Header, Footer) and a variable part (Body).

In the test data generation (S6) step, the test action generator 13 can fetch information suitable for the test action from the test persona repository 133. As described above, due to the nature of the application or website, there are cases in which a specific operating system or an actual operating email, a mobile phone number, and credit card information can be requested. Accordingly, the test action generator 13 can generate input data according to the test scenario by fetching information corresponding thereto from the repository.

In the test action execution (S7) step, the test action generator 13 can transfer and perform operations such as inputting or clicking data on the screen to the operating system.

Finally, in the test action result verification (S8) step, before or after the test action is performed, a message or system log of the application or the website is verified to detect whether an error has occurred, and a report to be transferred to the developer is stored. When the result of performing the test, operation needs to be checked in the external system, such as sending an email or entering a social media comment, it can be verified by accessing the external system through the external service integration unit 14 as described above.

Figure 3:
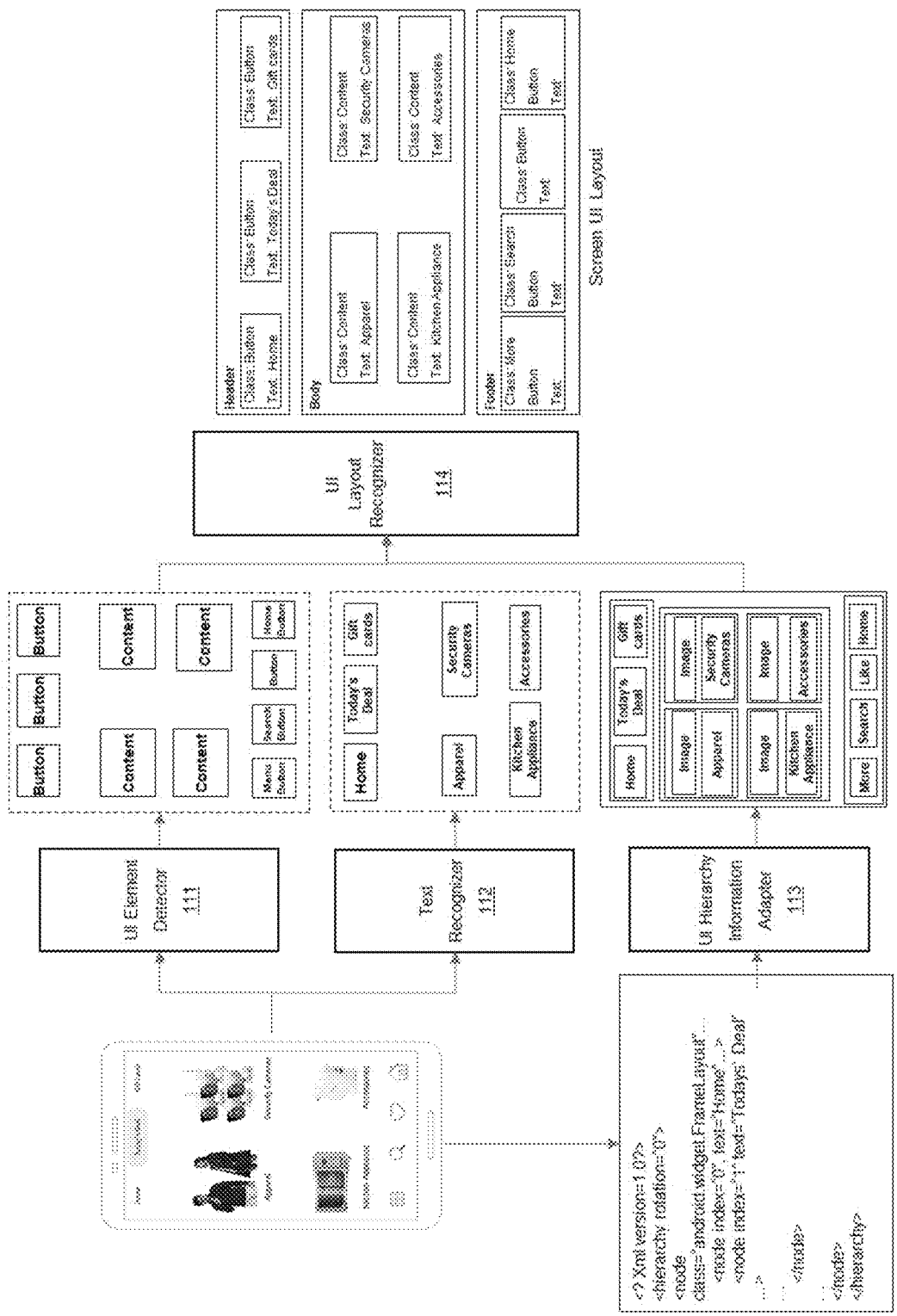
FIG. 3 illustrates a diagram illustrating a detailed configuration and actions of a testable action recognizer of the system for user interface autonomous testing according to the embodiment of the present invention on an exemplary home screen.
Figure 4:
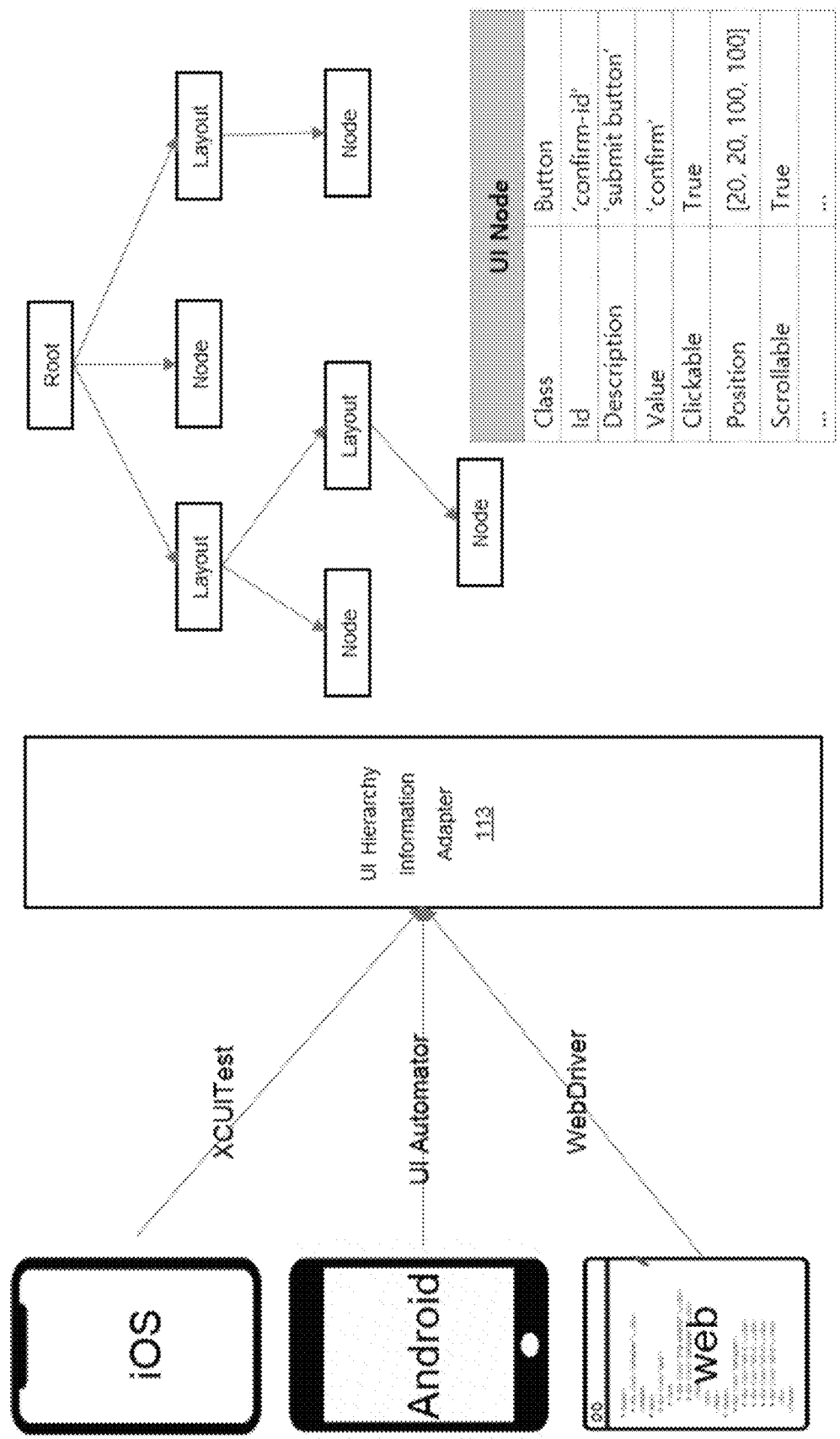
FIG. 4 illustrates a diagram illustrating a UI layer information adapter of the system for user interface autonomous testing according to the embodiment of the present invention on an exemplary home screen.
Figure 6:
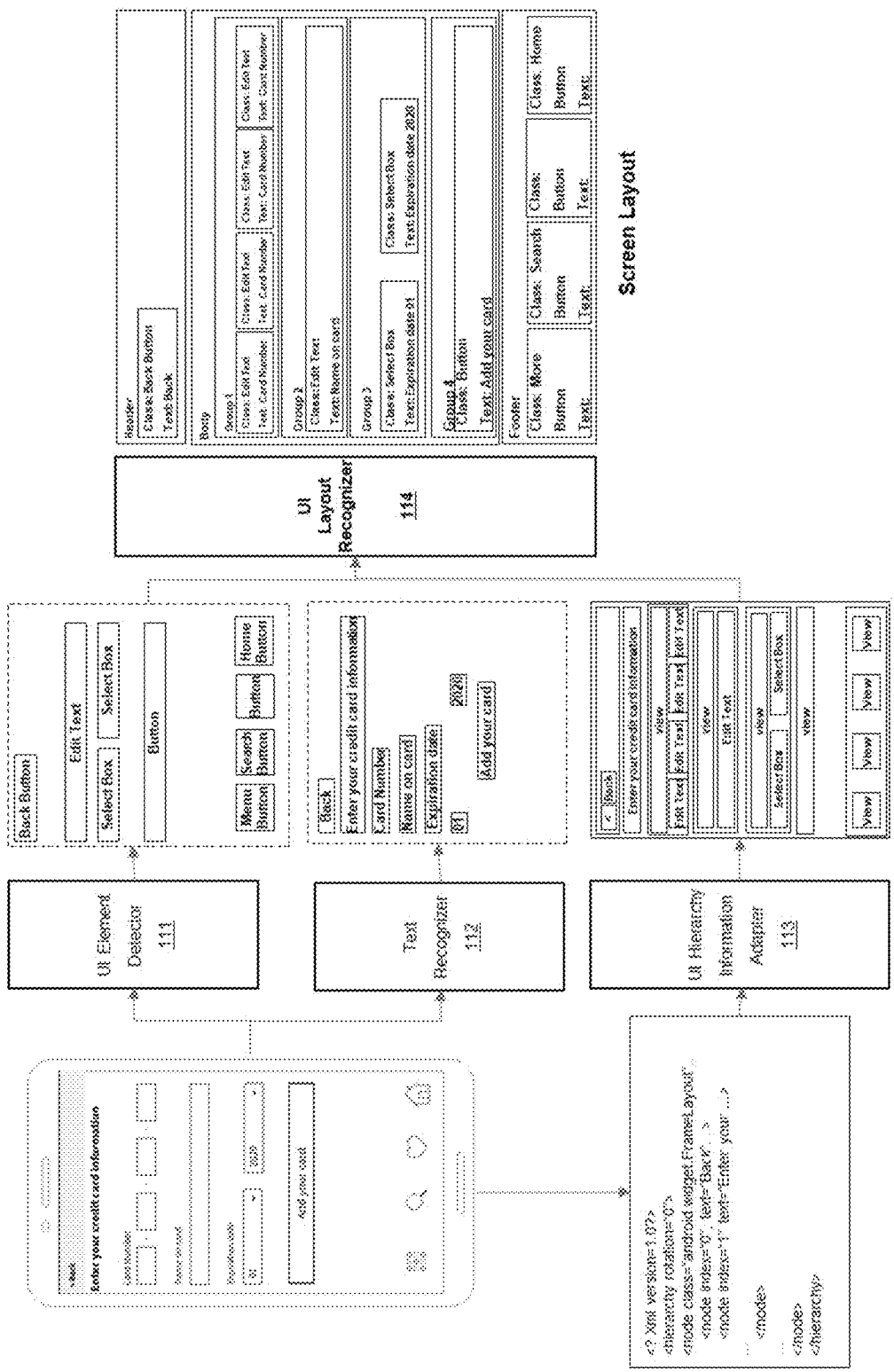
FIGS. 6A to 6C illustrate diagrams illustrating a detailed configuration and actions of a test action manager of the system for user interface autonomous testing according to an embodiment of the present invention on an exemplary credit card information input screen.
Figure 6:
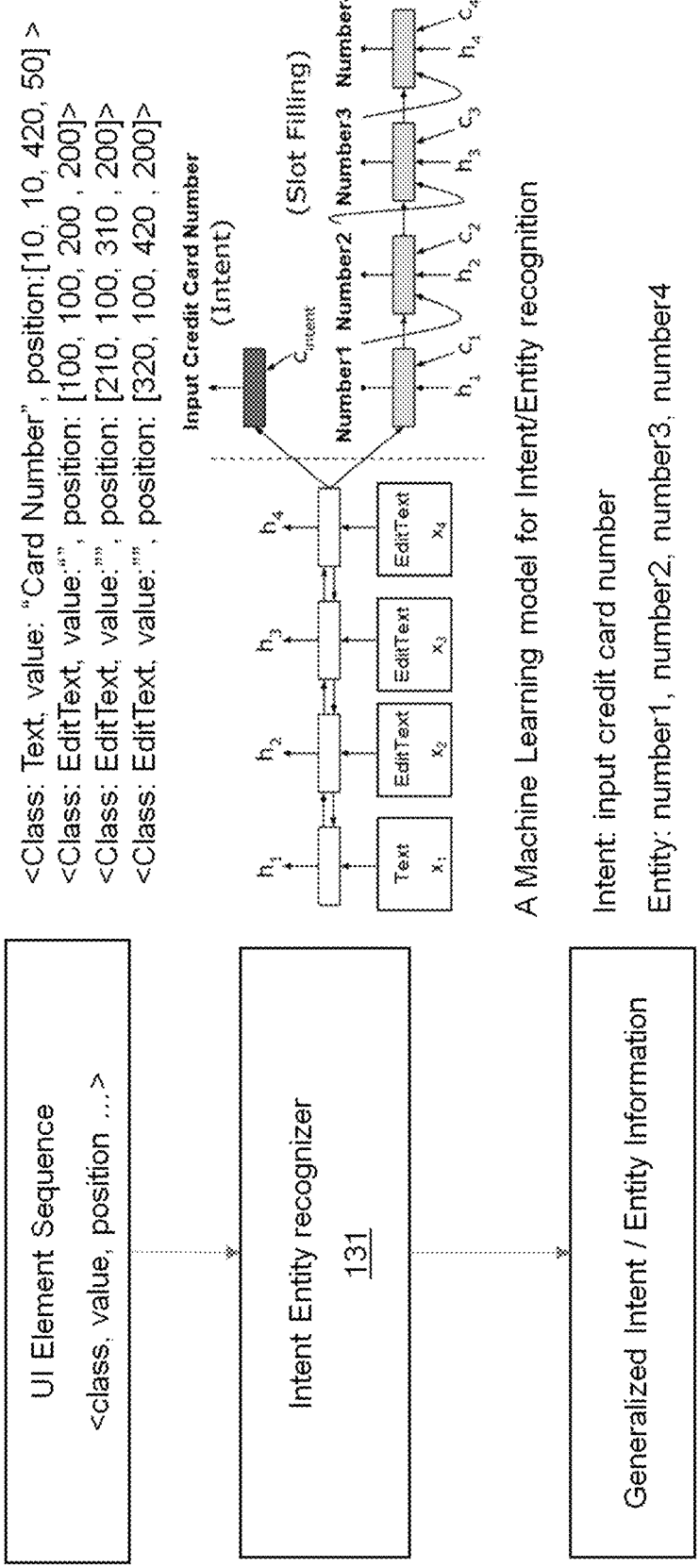

On the other hand, FIGS. 6A to 6C illustrate diagrams illustrating the detailed configuration and operation of the testable action recognizer of the system for user interface autonomous testing according to an embodiment of the present invention on the personal information input screen unlike the example of the shopping mall home screen of FIG. 3. Referring to FIG. 6A, as described above, as the test proceeds, the UI layout recognizer 114 can combine the approved UI element object, text, and the UI hierarchy to form a layout as illustrated in FIG. 6A, and, first group respective components of the layout into a common part (Header, Footer) and a variable part (Body), and then group the UI components in the variable section again into information integrity units. In this example, the variable part was classified into four groups of Card Number, Name on Card, Expiration date, and Add your Card.

In this case, as illustrated in FIG. 6B, based on the UI configuration detected by the UI element detector 111 and the text recognized by the text recognition unit 112, the intent/entity recognizer 131 can recognize an intent and an entity of a corresponding area based on a machine learning parameter based on deep learning learned in advance. For example, when four text input UI elements (EditText) are on the same horizontal line as illustrated in FIG. 6I, the intent/entity recognizer recognizes the definition and format of the intent of "credit card number input" and the entity of "card number" consisting of "4 input values", in consideration of the text information "Card Number" and "Enter your Credit Card Number" closest to the four text input UI elements (EditText).

Using this, the test action generator 13 can query and fetch information on a card that can be actually input as illustrated in FIG. 13A from the test persona repository 133, and assigns a card number to be input to each UI element of the test action table as illustrated in FIG. 13B so that the test is performed.

Hereinafter, the action of the test action manager in the system for user interface autonomous testing according to an embodiment of the present invention will be described in detail.

Figure 7:
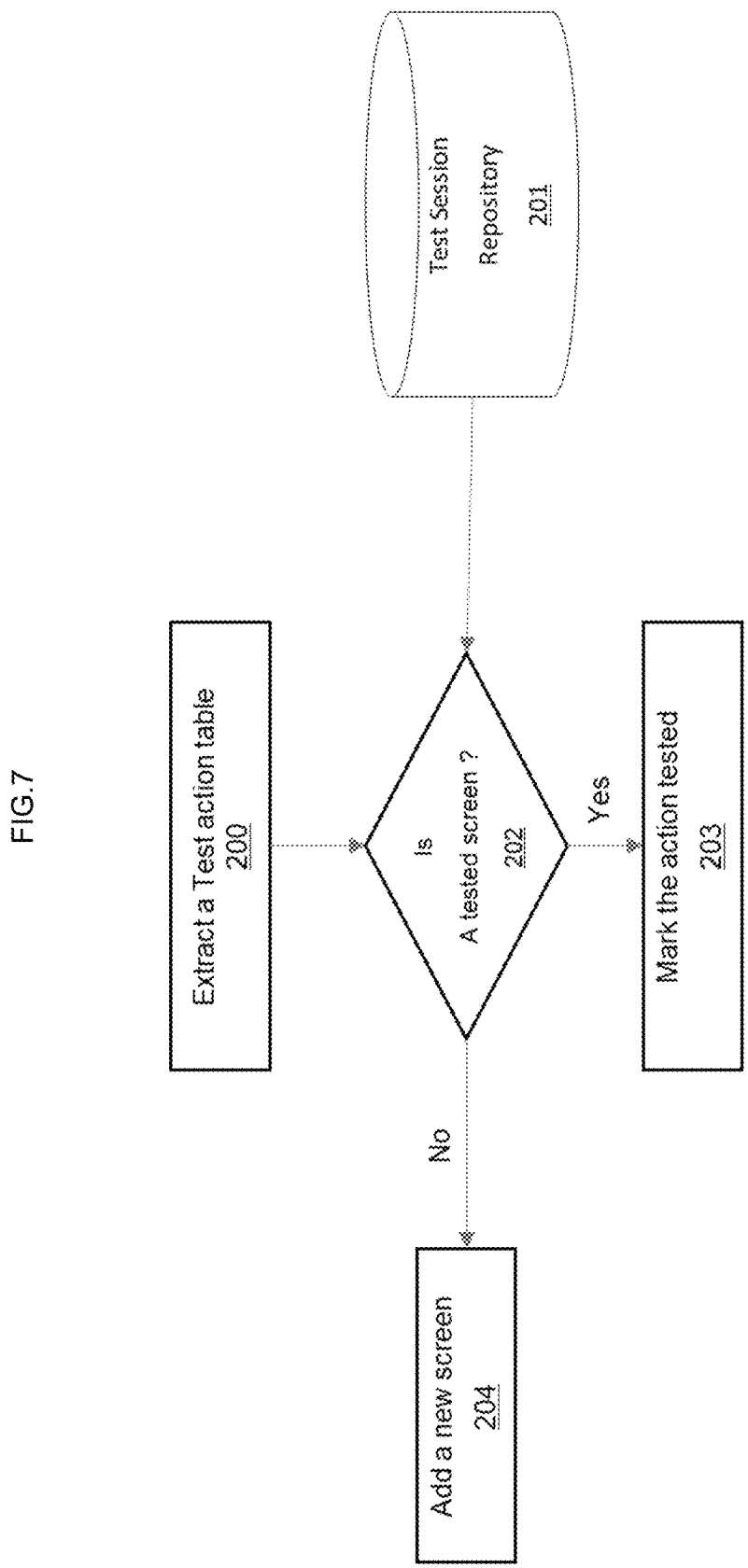
FIG. 7 illustrates a flowchart illustrating actions of the test action manager of the system for user interface autonomous testing according to the embodiment of the present invention on an exemplary home screen.

FIG. 7 illustrates a flowchart illustrating the action of the test action manager of the system for UI autonomous testing according to an embodiment of the present invention on an exemplary home screen, and FIG. 8 is a diagram illustrating a test action table of the test action manager of the system for user interface autonomous testing according to an embodiment of the present invention on an exemplary home screen. In the execution of the test action, the test action manager 115 extracts the test action table using information on the type (Class) and displayed value (Value) of the UI element object, as illustrated in FIG. 12 (200), and compares the table information with the test action table that has been previously tested to determine whether there is already a tested operation in the corresponding screen (202). In this case, a separate test session repository 201 can be provided. In this case, the test action manager 115 can determine whether or not a test is in progress with reference to the test session repository 201. In addition, when the screen is tested (Yes), the test action manager 115 can record that the screen has been tested (Yes) with respect to the test action table as illustrated in FIG. 8, and specific test action contents (e.g., touch, horizontal scroll, vertical scroll) can be recorded together (203). In addition, when the screen has been tested (Yes), the test operation manager 115 can record that the screen has been tested (Yes) with respect to the test operation table as illustrated in FIG. 8, and can record specific test operation contents (e.g., touch, horizontal scroll, vertical scroll) can be recorded together (203). On the other hand, if the screen is not tested (No), the test action manager 115 can record that the screen has not been tested (No) in the test action table as illustrated in FIG. 8 to be used by the test action generator 13.

In this way, the test action manager 115 can organize the test progress in the form of a table as illustrated in FIG. 8 or 9 in progressing the test of each screen according to the test scenario according to the test scenario, compares the table with the previously created and stored table after each screen is recognized, and integrates the tables if the tables are identical, thereby capable of preventing repetitive tests from being performed.

Meanwhile. FIG. 8 illustrates a table illustrating a test action table of a test action manager of a system for user interface autonomous testing according to an embodiment of the present invention on an exemplary personal information input screen. As illustrated in FIG. 8, when a card input is involved, the test action table can also display that the card number has been input in addition to the existing operation such as touch.

Figure 10:
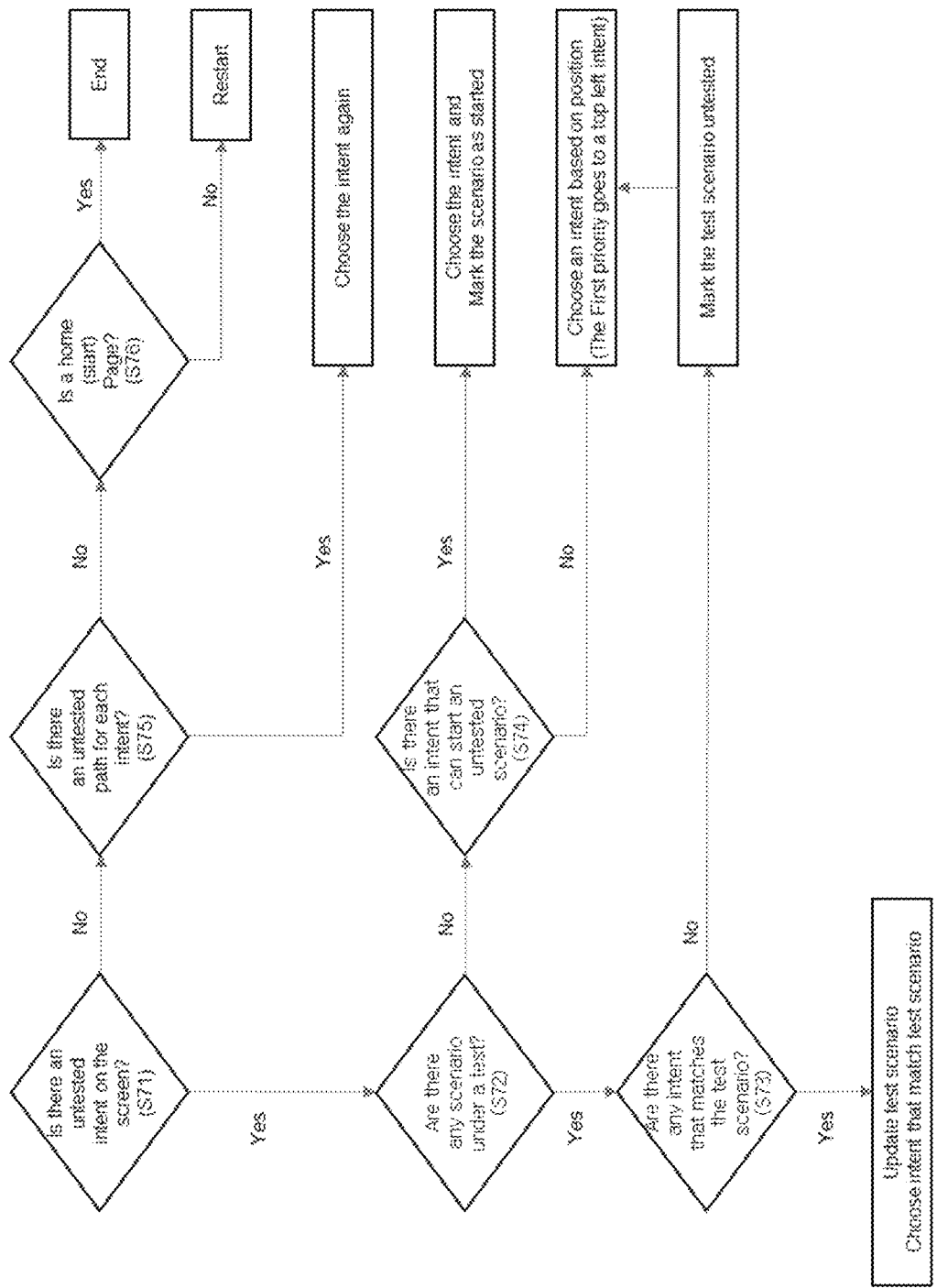
FIG. 10 illustrates a flowchart illustrating actions of determining a next test action as a test proceeds in the system for user interface autonomous testing according to the embodiment of the present invention.

Meanwhile, FIG. 10 illustrates a flowchart illustrating a process of determining a next test action as a test proceeds in a system for user interface autonomous testing according to an embodiment of the present invention. As illustrated in FIG. 10, when determining each intent to be tested, the test action manager 115 can check whether or not there is an untested intent in the corresponding screen (S71). If there is the untested intent (Yes), the test action manager 115 can check whether or not there is a scenario being tested (S72). In addition, if there is the scenario being tested (Yes), it is checked whether or not there is an intent matching the scenario (S73), and if there is the intent that matches the scenario (Yes), an action of selecting an intent according to the test scenario is continued. However, if there is no intent that matches the scenario, there is no way to proceed with the preset test scenario, and thus the information that the test scenario is in progress is reset and the next intent to be tested is decided based on the location information in the screen of each intent. For example, if a payment scenario has progressed to the credit card input at the shopping mall and no possible intent is found in the payment scenario such as "payment" or "modify delivery address" on the next screen, the payment scenario cannot be continued, and thus all scenario progress statuses are reset to ensure that the payment scenario is processed again from the beginning.

Meanwhile, if there is no scenario being tested among the untested intents, it can be checked whether there is an untested scenario starting with the corresponding intent (S74). If there is the untested scenario (Yes), it starts the scenario that starts with that intent. For example, if an intent such as "Add Cart" is found on the screen while the payment scenario has not been executed, "Add Cart" is selected as the next test action and it is indicated that the payment scenario test has started. If there is no appropriate scenario (No), another intent can also be selected based on the location on the screen.

On the other hand, if there is no untested intent on the screen, it is checked whether there is another test path performed with intents in the screen (S75), and if there is the other test path (Yes), the corresponding intent can be selected again. On the other hand, if there is no other test path (No), it is checked whether it is the home screen (S76), and if it is not the home screen (No), the process is restarted to return to the home screen to proceed with the test. If it is the home screen (Yes), the test for all sub-paths has been completed, and thus the test ends.

Hereinafter, an example of data stored in a test persona repository and a method of efficiently expanding persona data will be described, in the system for user interface autonomous testing according to an embodiment of the present invention.

Figure 11B:
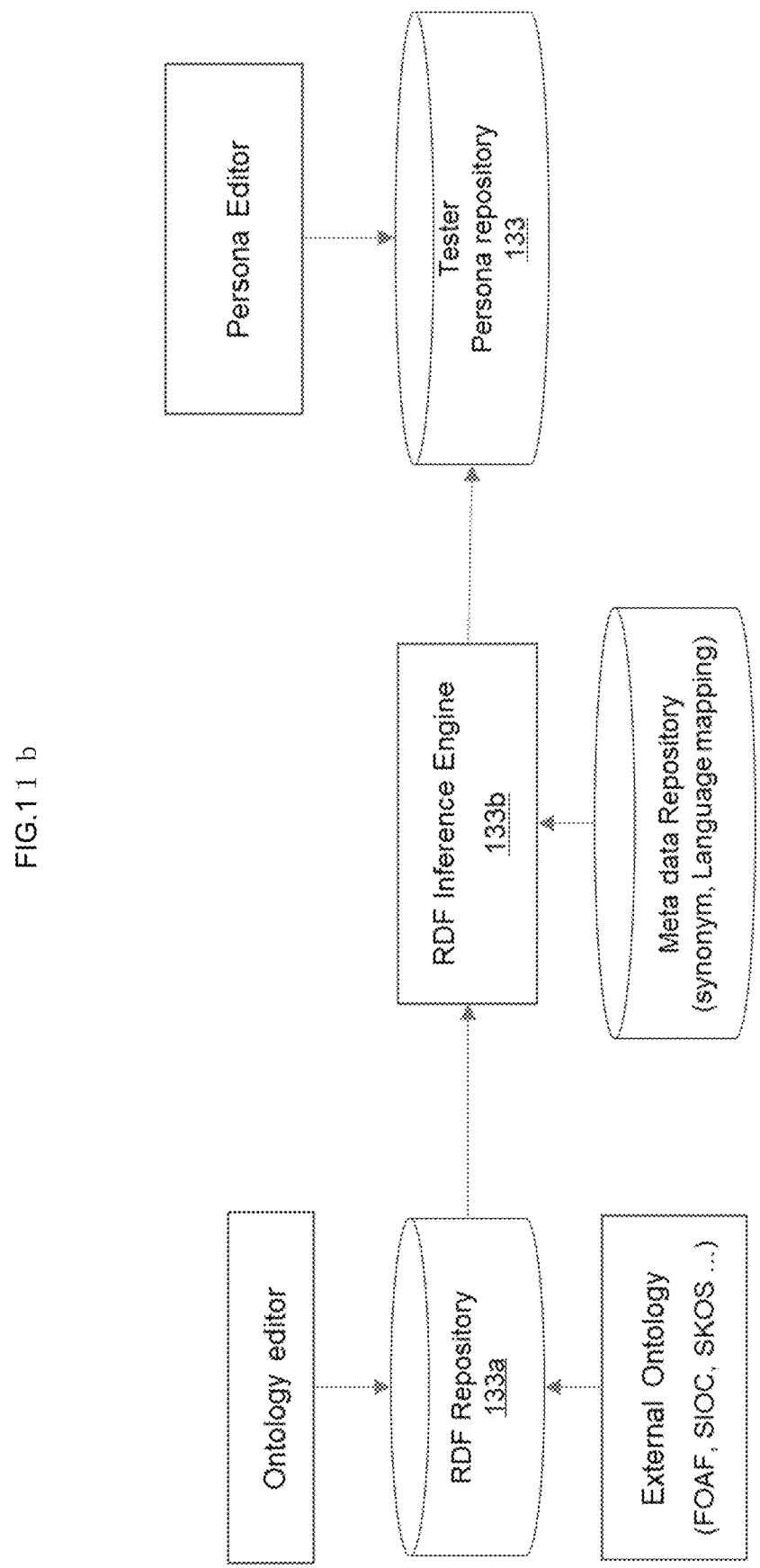
FIGS. 11A to 11C illustrate actions of fetching information of an exemplary persona used in the system for user interface autonomous testing according to the embodiment of the present invention from a persona repository.
Figure 11:
Figure 13:
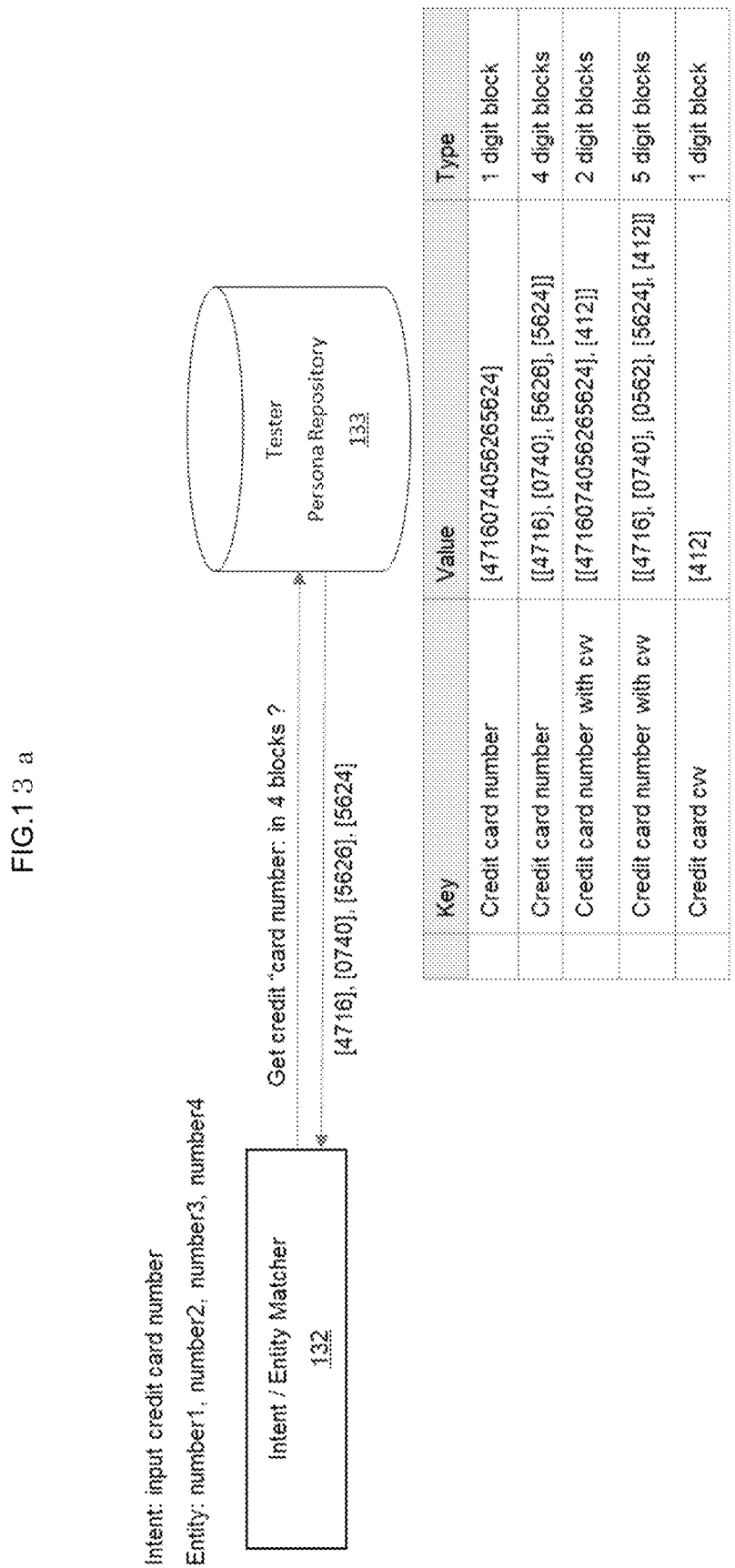
FIGS. 13A and 13B illustrate diagrams illustrating a process in which the intent/entity matcher fetches persona information in the system for user interface autonomous testing according to the embodiment of the present invention.

FIGS. 11A to 11C illustrate an action of fetching information of an exemplary persona used in a system for UI autonomous testing according to an embodiment of the present invention from a persona repository.

As illustrated in FIG. 11A, a virtual person named 'John Doe' can be stored in the test persona repository 133, for example, and information such as occupation, email, address, mobile phone number, credit card information, chat app, and social media can be set for the person. In addition, the test persona repository 133 can store at least one or more, preferably a plurality of such virtual persons, and appropriate information of the virtual person can be utilized according to a required test scenario.

As illustrated in FIG. 11B, in the test persona storage 133, an RDF repository 133a and an RDF inference engine 133b can be connected to the background. Here, the resource description framework (RDF) is a method of managing information in three pairs, such as <subject, predicate (relation), and object>, and can be replaced with a similar information management method. The RDF repository 133a refers to a repository that collects and stores virtual person data for testers created by itself and external ontology, and the RDF inference engine 133b can play a role of converting RDF into data in a format such as <Key, Value>, that is, <Name, 'John Doe'> required for final testing. In this process, the inference engine generates can generate more information than input data and relationships through data transformation using the role of information inference to generate new relationships by integrating external and internal data and synonyms or language mapping information. For example, information such as <'John Doe', 'Company Address', 'S California Avenue, Palo Alto'> can be generated by combining internal information such as <'John Doe', 'Company Name', 'Facebook'> and information collected from the external Internet such as <'Facebook', 'address', 'S California Avenue, Palo Alto'>.

As illustrated in FIG. 11C, the test persona repository 133 stores data converted from the RFD inference engine 133b in the form of a table. Accordingly, required data according to the test scenario can be provided to the test action generator 13 in the form of the corresponding table.

Hereinafter, the repository table of the intent/entity recognizer will be described as an example.

FIG. 12 illustrates a table for storing persona information used in the system for user interface autonomous testing according to an embodiment of the present invention in the intent/entity recognizer.

As illustrated in FIG. 12, the intent/entity recognizer 131 can classify the intent/entity based on the UI configuration or OCR information grasped from the screenshot, and can organize the intent/entity as a table. In addition, since the table can be shared with the test action manager 115, whether or not the intent has been tested can also be recorded through the table.

Hereinafter, a process in which the persona information is fetched by the intent/entity matcher will be described.

FIGS. 13A and 13B illustrates a process in which the intent/entity matcher fetches persona information in the system for UI autonomous testing according to an embodiment of the present invention.

As illustrated in FIG. 13A, according to a test scenario, the intent/entity matcher 132 communicates with the test persona repository 133 and can fetch persona data that fits a required format. In this case, in the test persona repository 133, for example, in the case of a card number, the persona data can be composed of a combination of a card number of 16 numbers with cvv of 3-digit number, but the card number can be stored in various forms such as —digit block, 4-digit blocks, 2-digit blocks, and 5-digit blocks, respectively, to fit the input format of various applications, and the intent/entity matcher 132 loads data in a format that fits an application.

Hereinafter, an exemplary test scenario management method will be described.

Figure 14:
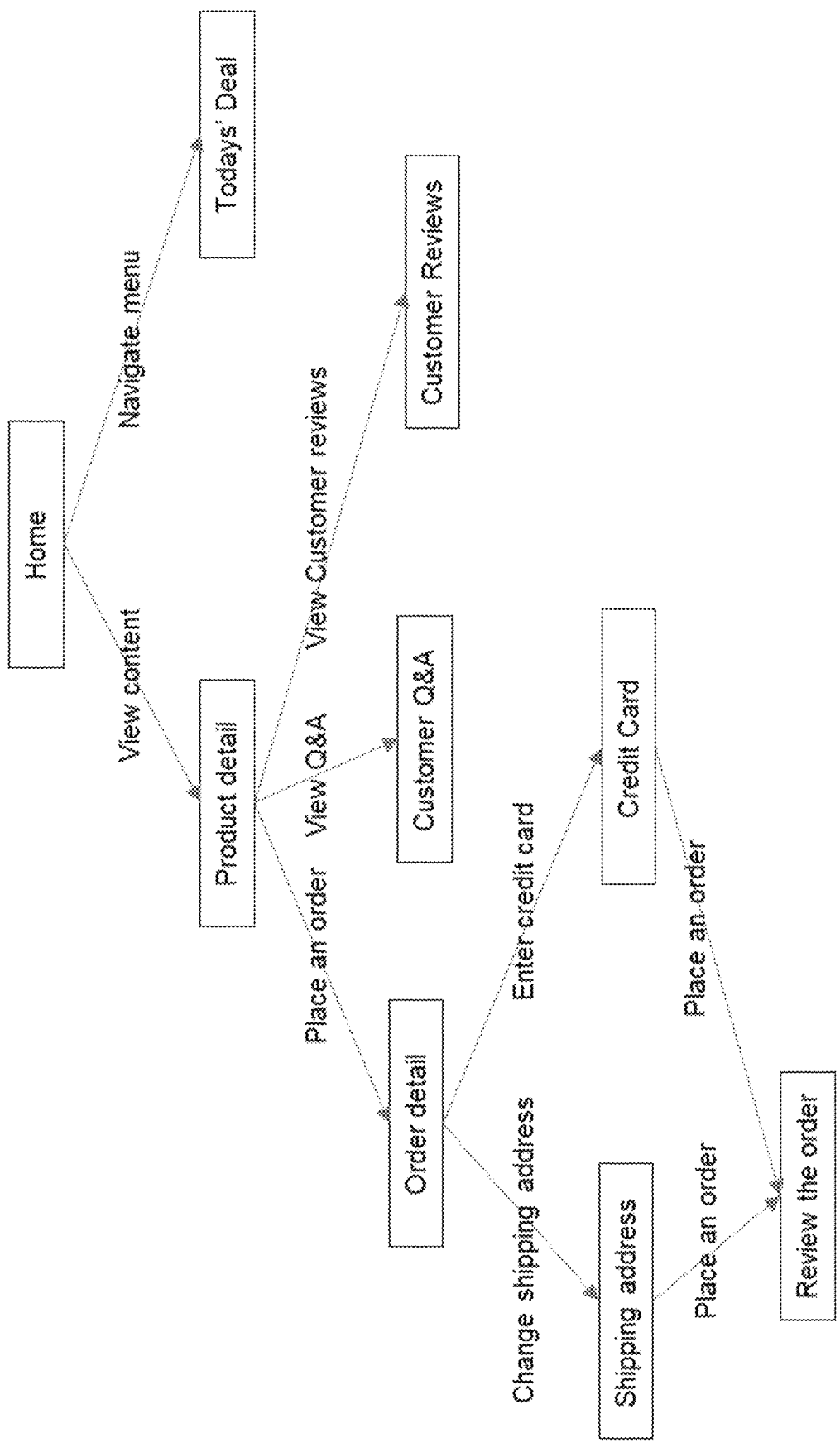
FIG. 14 illustrates an example of a test scenario stored in a graph structure of intents in the system for user interface autonomous testing according to the embodiment of the present invention.

FIG. 14 illustrates an example of an intent-based test scenario managed in a system for user interface autonomous testing according to an embodiment of the present invention in a graph structure.

Referring to FIG. 14, it can be seen that there are various paths from the first 'home' screen to the 'review order' screen where the payment test is completed. For example, when paying with a credit card, the required test actions are sequentially "View content"→'Place order' →'Enter credit card'→'Place Order'. It is possible to define a generalized test scenario independent of the application by continuously managing the intent required to switch to the next screen of the test scenario. In the generalized test scenario, the intent of the screen under test is recognized in real time during the test, and the corresponding test scenario is determined and executed in real time, and thus tests can be automatically performed without human intervention and creating test scenarios for each application.

Hereinafter, an implementation example of a user interface system will be described according to an embodiment of the present invention.

Figure 15:
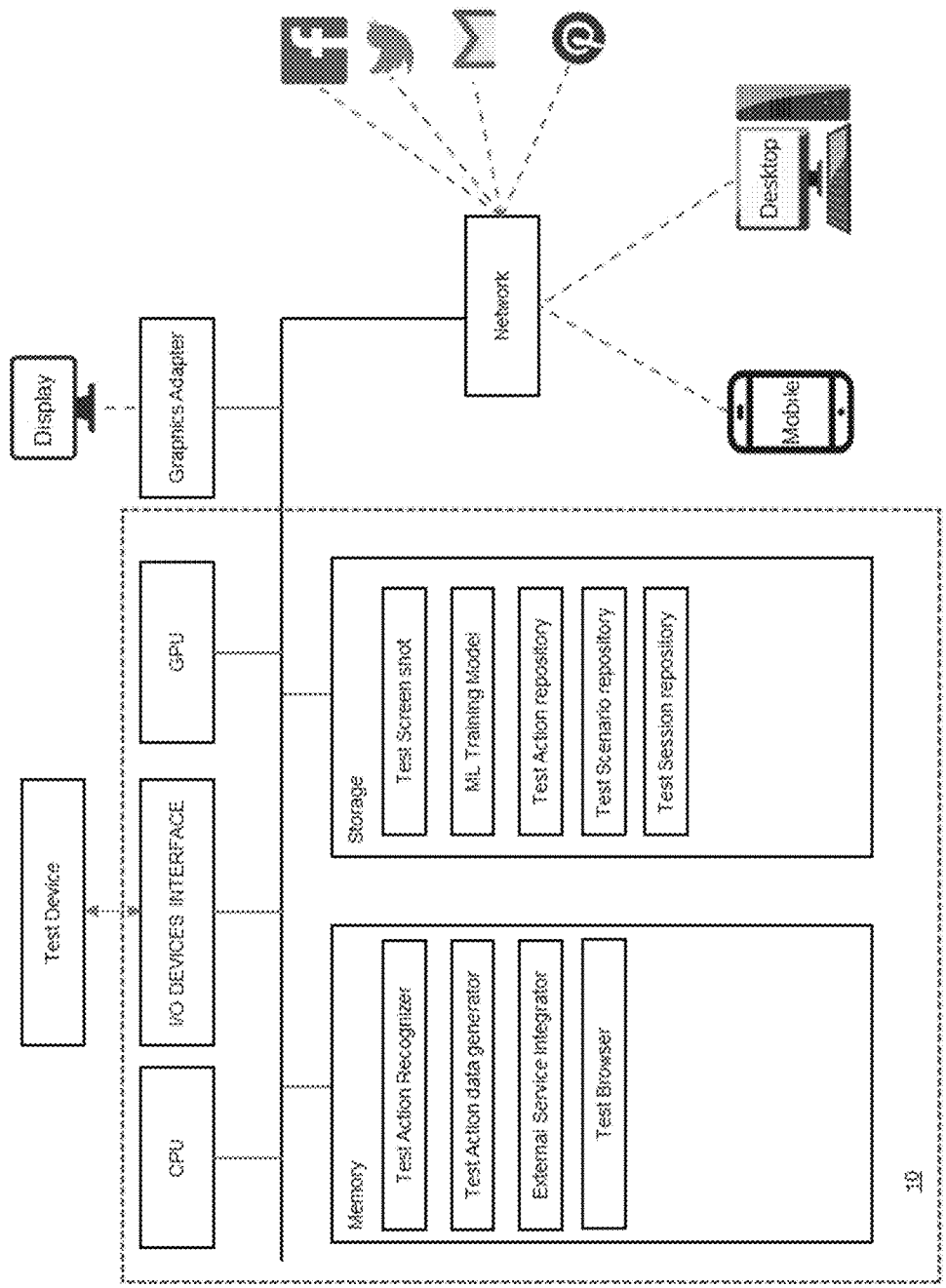
FIG. 15 illustrates an example of an implementation of the system for user interface autonomous testing according to the embodiment of the present invention in a single desktop or server.
Figure 16:
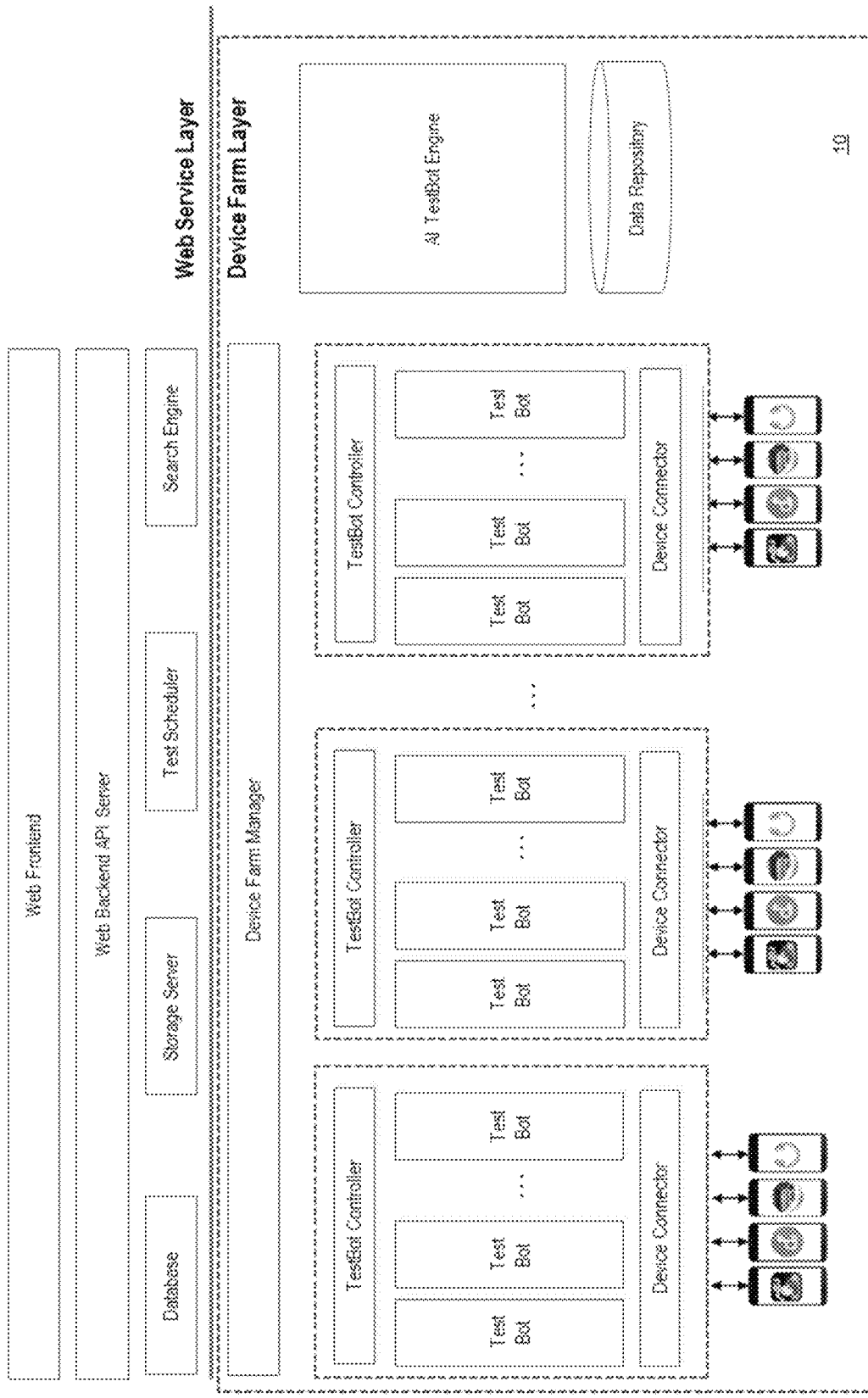
FIG. 16 illustrates an example of a cloud-based implementation of the system for user interface autonomous testing according the embodiment of the present invention.

FIG. 15 is an example of an implementation of a system for user interface autonomous testing according to an embodiment of the present invention. FIG. 16 is another example of an implementation of a system for user interface autonomous testing according to an embodiment of the present invention.

As illustrated in FIG. 15, the user interface system 10 can be provided in the form of a device that is separately provided and combined with the test device. In this case, the user interface system 10 can include a configuration of a CPU, GPU, storage, and memory, and can include an I/O device interface for connection with a test device.

Here, the logic and all the data referenced by the logic can be stored in the repository, but the logic required for the operation can be reloaded into the memory. In addition, operations such as object detection, OCR, and object recognition can be processed by the GPU, but in some cases, the CPU can be responsible for most logic including the operations.

Meanwhile, as illustrated in FIG. 16, the system for user interface autonomous testing can be implemented in a cloud form.

As illustrated in FIG. 16, there is a test device to install an application at the bottom of the configuration, but it is possible to replace the test device with an emulator or VM instead of a real device.

In addition, in implementation of the cloud form, each agent that is directly connected to a device through a device connector and performs a test is called a Testbot. The Testbot can play a role of installing the application, collecting screen shots and accessibility information of the application, sending them to an AI Testbot engine, and then executing the test operation determined by the AI Testbot engine. In addition, when the Testbot controller receives a test request from the user, the Testbot controller can allocate the Testbot and monitor the test execution.

In addition, in the cloud form, devices are shared by multiple users, and thus the same model is usually distributed across multiple servers, and, when a user request comes, the device farm manager can select the least loaded Testbot controller to which the device is connected and assign the test task. In this case, the user can select a model and request a test regardless of where the device he or she is using is actually connected.

On the other hand, the AI Testbot Engine can perform all operations to determine the next test action and detect errors by receiving application screenshot information and log information sent by each Testbot.

What has been described above is only one embodiment for implementing the user interface autonomous testing system and method according to the present invention, and the present invention is not limited to the embodiment described above, and as claimed in the claims below, anyone of ordinary skill in the field to which the present invention belongs without departing from the gist of the present invention will be said to have the technical spirit of the present invention to the extent that various changes can be implemented. The above-described embodiment is merely one embodiment for carrying out the battery module, and the present disclosure is not limited to the embodiment, and the technical spirits of the present disclosure include all ranges of technologies that may be variously modified by an ordinary person in the art, to which the present disclosure pertains, without departing from the essence of the present disclosure as claimed in the following claims.

EXPLANATION OF REFERENCE NUMERALS

10; System for User Interface Autonomous Testing
11; Testable action recognizer
111; UI element object detector
112; Text recognizer
113; UI hierarchy information adapter
114; UI layout recognizer
115; Test action manager
12; Issue detector
13; test action generator
131; Intent/Entity recognizer
132; Intent/Entity matcher
133; Test persona repository
134; Test scenario repository
14; External service integrator

What is claimed is:

1. A system for testing an error in a user interface (UI) of an application or website, the system comprising:
   a testable action recognizer configured to:
      obtain a screenshot of a screen of the application or website,
      recognize a layout based on UI configuration and text recognition information from the screenshot, and
      convert the layout into a test action; and
   a test action generator configured to:
      receive the test action,
      select a test scenario corresponding an intent to the test action, and
      perform the test action according to the test scenario,
   the testable action recognizer is further configured to
      manage whether or not a test is progressed for each screen layout according to the test scenario,
      responsive to detecting a first screen has been tested, record the first screen as tested in a table to prevent repetitive tests from being performed, wherein the table further records contents of the test action performed on the first screen, and
      responsive to detecting a second screen has not been tested, record the second screen in the table for future testing,
      recognize the layout by combining the UI configuration and text recognition information of the screen and hierarchical structure information provided by an operating system,
   wherein the testable action recognizer includes a UI element detector configured to:
      learn and store a model parameter recognizing a UI element object through machine learning, and detect the UI element object based on the model parameter,
   the system further comprises a test operation manager, configured to
      store the corresponding layout, test operation, and intent in the table together; and
      prevent a duplicate test even when there is a change in design or a value of the screen based on derived test operation information.

2. The system of claim 1, wherein the testable action recognizer includes a test action manager, and the layout is grouped into a common part and a variable part shared by screens of an application or website.

3. The system of claim 2, wherein the test action manager is further configured to store a layout of a corresponding screen and a required test action in the table.

4. The system of claim 1, wherein the test action generator includes an intent/object detector configured to separate and store a text obtained through the UI configuration or text recognition information into an intent and an object.

5. The system of claim 1, wherein the test action generator includes a test persona repository in which information of a virtual person set in advance is previously stored.

6. The system of claim 5, wherein the test action generator includes an intent/object matcher configured to fetch information of a virtual person for which data in a matching form is set from the test persona repository according to the text obtained through the UI configuration or text recognition information.

7. The system of claim 5, wherein the test persona repository is further configured to store at least one virtual person having email, mobile phone number, and credit card information available for a real test.

8. The system of claim 1, wherein a result of the user interface test action is verified by accessing an external service using test persona account information, and an error is detected.

9. The system of claim 1, wherein the testable action recognizer is further programmed to:
   test a first intent on the first screen to reach a third screen via a first path; and
   responsive to detecting a second path between the first screen and the third screen, test the first intent on the first screen to reach the third screen via the second path.

10. A method for testing an error in a user interface of an application or website, the method comprising:
   fetching, by a test action generator, a test scenario for an application or website;
   recognizing, by a testable action recognizer, a layout through a screenshot of the application or website;
   selecting, by the test action generator, a test action based on the test scenario and the layout;
   generating, by the test action generator, test data;
   performing, by the test action generator, the test action on a screen of the application or website;

managing, by a test action manager, whether or not the test is progressed through a table;

storing, by a test operation manager, the corresponding layout, test operation, and intent in the table together;

preventing, by the test operation manager, a duplicate test even when there is a change in design or a value of the screen based on derived test operation information; and recognizing, by the testable action recognizer, a layout by combining a user interface (UI) configuration and text recognition information of the screen and hierarchical structure information provided by an operating system, wherein the testable action recognizer includes a UI element detector, the method further comprising:

learning and storing, by the UI element detector, a model parameter recognizing a UI element object through machine learning; and detecting, by the UI element detector, the UI element object based on the parameter.

11. The method of claim 10, wherein the test action generator includes an intent/object detector, the method further comprising:

separating and storing, by the intent/object detector, a text obtained through a user interface (UI) configuration or text recognition information into an intent and an object.

12. The method of claim 10, wherein the test action generator includes a test persona repository in which information of a virtual person set in advance is previously stored.

13. The method of claim 12, wherein the test action generator further includes an intent/object matcher, the method further comprising:

fetching, by the intent/object matching, information of a virtual person for which data in a matching form is set from the test persona repository according to the text obtained through the UI configuration or text recognition information.

14. The method of claim 12 further comprising:

storing, by the test persona repository, at least one virtual person having email, mobile phone number, and credit card information available for a real test.

15. The method of claim 10 further comprising:

verifying a result of the user interface test action by accessing an external service using test persona account information, and an error is detected.

16. The method of claim 10, further comprising:

testing a first intent on a first screen to reach a third screen via a first path; and responsive to detecting a second path between the first screen and the third screen, testing the first intent on the first screen to reach the third screen via the second path.

* * * * *